US010623633B2

(12) United States Patent
Tanaka (10) Patent No.: US 10,623,633 B2
(45) Date of Patent: Apr. 14, 2020

(54) IMAGE SYNTHESIS DEVICE AND IMAGE SYNTHESIS METHOD

(71) Applicant: PANASONIC INTELLECTUAL PROPERTY MANAGEMENT CO., LTD., Osaka (JP)

(72) Inventor: Yoshiteru Tanaka, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/558,413

(22) PCT Filed: Feb. 2, 2016

(86) PCT No.: PCT/JP2016/000515
§ 371 (c)(1),
(2) Date: Sep. 14, 2017

(87) PCT Pub. No.: WO2016/151991
PCT Pub. Date: Sep. 29, 2016

(65) Prior Publication Data
US 2018/0077347 A1      Mar. 15, 2018

(30) Foreign Application Priority Data

Mar. 26, 2015    (JP) ................................. 2015-064293

(51) Int. Cl.
*H04N 5/225*           (2006.01)
*H04N 5/232*           (2006.01)
(Continued)

(52) U.S. Cl.
CPC ..... *H04N 5/23229* (2013.01); *G06K 9/00234* (2013.01); *G06K 9/4661* (2013.01);
(Continued)

(58) Field of Classification Search
None
See application file for complete search history.

(56) References Cited

U.S. PATENT DOCUMENTS

2001/0037191 A1* 11/2001 Furuta ..................... G06F 19/00
    703/6
2003/0007071 A1*  1/2003 Goto .................... A45D 44/005
    348/61

(Continued)

FOREIGN PATENT DOCUMENTS

CN        103180872 A      6/2013
JP        11-120336 A      4/1999
(Continued)

OTHER PUBLICATIONS

International Search Report (ISR) in International Pat. Appl.P No. PCT/JP2016/000515, dated Mar. 15, 2016.
(Continued)

*Primary Examiner* — Twyler L Haskins
*Assistant Examiner* — Dwight Alex C Tejano
(74) *Attorney, Agent, or Firm* — Greenblum & Bernstein, P.L.C.

(57) ABSTRACT

An image synthesis device includes imaging unit (110) that photographs video, displayer (150) that displays the photographed video, and makeup image superimposing unit (140) that changes brightness of a makeup image superimposed with a face of the video on a pixel basis and superimposes the makeup image of which the brightness is changed on the face of the video, every time skin brightness of the face included in the video changes. Even if the brightness that illuminates the face changes, it is possible to synthesize the makeup image with an image familiar to the skin in real time.

10 Claims, 10 Drawing Sheets

(51) Int. Cl.
*H04N 5/272* (2006.01)
*G06K 9/46* (2006.01)
*G06K 9/00* (2006.01)
*H04N 9/68* (2006.01)
*H04N 5/243* (2006.01)
*H04N 5/235* (2006.01)
*H04N 9/77* (2006.01)

(52) U.S. Cl.
CPC ....... *H04N 5/2351* (2013.01); *H04N 5/23219* (2013.01); *H04N 5/23293* (2013.01); *H04N 5/243* (2013.01); *H04N 5/272* (2013.01); *H04N 9/68* (2013.01); *H04N 9/77* (2013.01)

(56) References Cited

U.S. PATENT DOCUMENTS

| | | | | |
|---|---|---|---|---|
| 2003/0041871 | A1* | 3/2003 | Endo | A45D 42/00 132/301 |
| 2003/0223622 | A1* | 12/2003 | Simon | G06K 9/00281 382/118 |
| 2005/0175234 | A1* | 8/2005 | Sakamoto | A47F 10/00 382/154 |
| 2006/0028452 | A1* | 2/2006 | Allen | A45D 44/005 345/173 |
| 2006/0197775 | A1* | 9/2006 | Neal | A45D 44/005 345/589 |
| 2008/0175481 | A1* | 7/2008 | Petrescu | G06K 9/00234 382/190 |
| 2009/0051779 | A1* | 2/2009 | Rolston | A46B 7/04 348/222.1 |
| 2010/0141784 | A1* | 6/2010 | Yoo | H04N 5/23219 348/222.1 |
| 2012/0027269 | A1* | 2/2012 | Fidaleo | G06Q 30/0268 382/118 |
| 2012/0105336 | A1* | 5/2012 | Chuang | H04N 7/183 345/173 |
| 2012/0223956 | A1* | 9/2012 | Saito | A45D 44/005 345/582 |
| 2013/0258118 | A1* | 10/2013 | Felt | A45D 44/005 348/207.1 |
| 2013/0271484 | A1* | 10/2013 | Aoki | A45D 44/005 345/593 |
| 2013/0271485 | A1 | 10/2013 | Aoki | |
| 2015/0049111 | A1* | 2/2015 | Yamanashi | G06T 11/001 345/632 |

FOREIGN PATENT DOCUMENTS

| | | |
|---|---|---|
| JP | 2000-196956 A | 7/2000 |
| JP | 2004-030007 A | 1/2004 |
| JP | 2008-243059 A | 10/2008 |
| JP | 2010-199720 A | 9/2010 |

OTHER PUBLICATIONS

English Translation of Chinese Search Report dated Sep. 24, 2019 for Chinese Patent Application No. 201680016242.7.

\* cited by examiner

| (Vf-Vl)/(Vh-Vl) | 1.00 | 0.99 | 0.97 | | 0.30 | | 0.00 |
|---|---|---|---|---|---|---|---|
| REFLECTION ANGLE (α) | 0 | 1 | 2 | ... | 30 | ... | 90 |

FIG. 11

| REFLECTION ANGLE (α) | 0 | 1 | 2 | ... | 30 | ... | 90 |
|---|---|---|---|---|---|---|---|
| BRIGHTNESS CHANGE RATE (β) | 1.00 | 0.95 | 0.80 | ... | 0.70 | ... | 0.65 |

IMAGE SYNTHESIS DEVICE AND IMAGE SYNTHESIS METHOD

TECHNICAL FIELD

The present disclosure relates to an image synthesis device and an image synthesis method.

BACKGROUND ART

There is a technology of virtual makeup that superimposes a makeup image such as cheek makeup on an image obtained by photographing a face and performs virtually makeup. With this technology, it is possible to display an image by generating the image of the face when performing the makeup without actually applying the makeup on the face.

Meanwhile, in recent years, an act of photographing a user himself/herself as a subject by using a smartphone or the like, so-called self-shooting or Selphy (hereinafter, referred to as "Selphy") is prevalent. Selphy images are used for browsing friends or the like on social media, or saved in albums for user's own ornaments. Many users apply beautiful facial treatments to make their faces look beautiful with respect to the photographed Selphy images. As one of the facial treatments, there is virtual makeup and it is possible to give makeup effect thereto.

Here, as a technology related to the present disclosure, a technology disclosed in PTL 1 can be mentioned. In PTL 1, an image synthesis device in which a background image is separately stored for each element in a depth direction in advance and a subject image is interposed and synthesized at an arbitrary position of the separated background image is disclosed. According to a position including a depth of the background image, the image synthesis device stores in advance brightness and saturation that are familiar to the background image when the subject is disposed, and synthesizes the subject image by correcting the subject image with the brightness and the saturation which has stored according to a position at which the subject image is disposed.

However, there is a problem that the brightness that illuminates the face often changes especially in outdoors when the virtual makeup is applied to the Selphy in real time, and the synthesized makeup image and color of skin on the skin does not match when the brightness that illuminates the face changes and thus the makeup image appears to be floated.

An object of the present disclosure is to synthesize a makeup image with an image familiar to the skin in real time, even if the brightness that illuminates the face changes.

CITATION LIST

Patent Literature

PTL 1: Japanese Patent Unexamined Publication No. 2000-196956

SUMMARY OF THE INVENTION

An image synthesis device according to one aspect of the invention adopts a configuration including an imaging unit that photographs video; a displayer that displays the photographed video; and a makeup image superimposing unit that changes brightness of a makeup image to be superimposed with a face of the video on a pixel basis and superimposes the makeup image of which the brightness is changed on the face of the video, every time skin brightness of the face included in the video changes.

An image synthesis method according to one aspect of the invention includes photographing video; displaying the photographed video; and superimposing a makeup image of which brightness is changed on a face of the video by changing the brightness of the makeup image superimposed with the face of the video on a pixel unit basis, every time skin brightness of the face included in the video changes.

According to the present disclosure, even if the brightness that illuminates the face changes, it is possible to synthesize the makeup image with an image familiar to the skin in real time.

DESCRIPTION OF EMBODIMENT

Hereinafter, an embodiment of the present disclosure will be described in detail with reference to the drawings. However, in the embodiments, the same reference numerals are given to the components having the same function, and duplicate explanation will be omitted.

(Embodiment 1)

<State of Usage of Device>

First, a state of usage of an image synthesis device according to embodiment 1 will be described.

Figure 1:
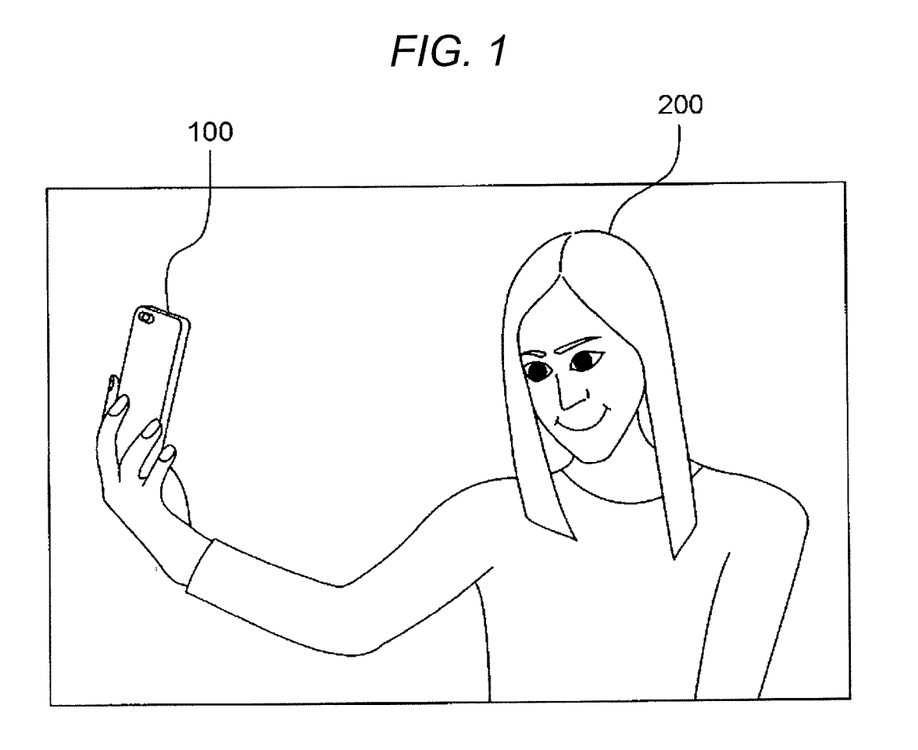
FIG. 1 is a diagram illustrating a usage example of an image synthesis device according to an embodiment 1.

FIG. 1 is a diagram illustrating a usage example of an image synthesis device according to embodiment 1.

As illustrated in FIG. 1, for example, image synthesis device 100 is a smartphone. Image synthesis device 100 includes a liquid crystal display with a touch panel (hereinafter, simply referred to as "display"), and an inner camera and an imaging button disposed on the same side as the display (none are shown). The imaging button may be a button image displayed on the display.

Image synthesis device 100 displays video obtained by photographing with the inner camera in real time. Image synthesis device 100 cuts out a still image from the video being displayed and records the still image, or starts recording of the video, at a timing when the imaging button is pressed.

For example, user 200 directs the inner camera to his/her face and pushes the imaging button at a desired timing while checking an image of his/her face with video displayed on the display. This is an act called as Selphy.

Image synthesis device 100 superimposes a makeup image on a face part of the video by image synthesis according to a touch operation on the touch panel by the user.

<Configuration of Device>

Next, a configuration of image synthesis device 100 will be described.

Figure 2:
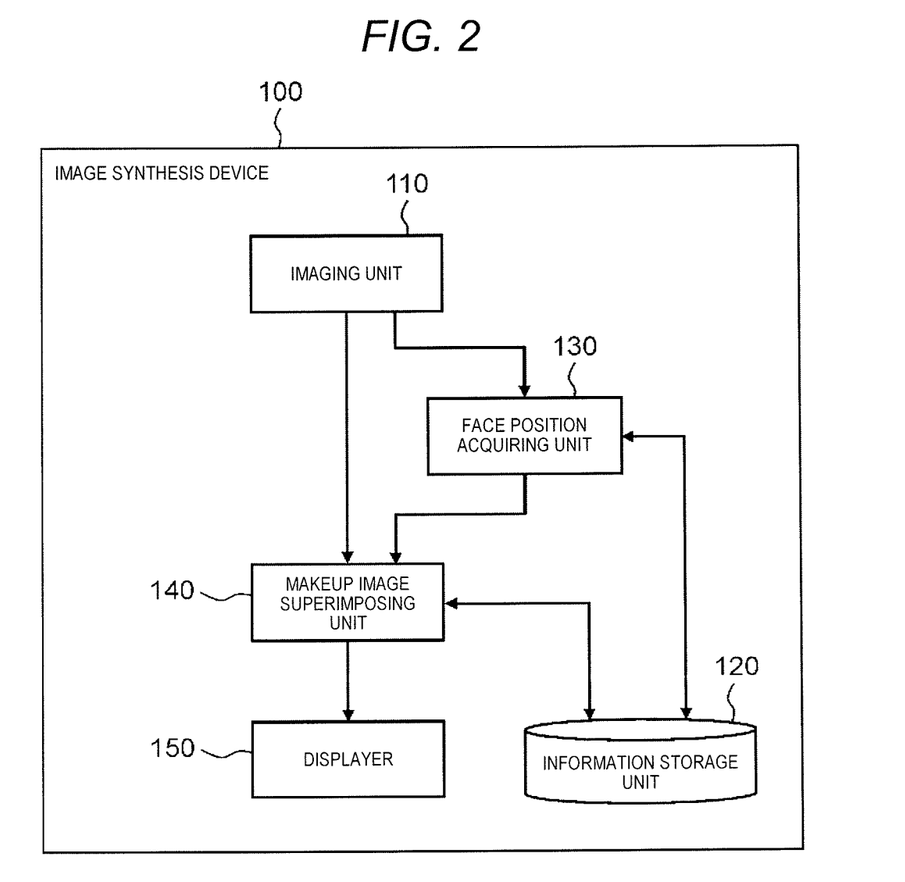
FIG. 2 is a block diagram illustrating a configuration of the image synthesis device according to embodiment 1.

FIG. 2 is a block diagram illustrating a configuration of image synthesis device 100 according to embodiment 1.

In FIG. 2, image synthesis device 100 includes imaging unit 110, information storage unit 120, face position acquiring unit 130, makeup image superimposing unit 140, and displayer 150.

For example, imaging unit 110 includes the above-described inner camera (digital camera), and photographs the video. In a case where the Selphy is performed, imaging unit 110 photographs the video of a face of a user or images of a plurality of people including the user. Then, imaging unit 110 outputs the photographed video to face position acquiring unit 130 and makeup image superimposing unit 140.

Information storage unit 120 stores in advance face feature information for detecting a face and a face part of a person included in the image from the image and makeup image information for superimposing on the face part of the video by generating the makeup image. In addition, information storage unit 120 stores makeup colors (hue Hc, brightness Vc, and saturation Sc) with respect to reference skin brightness.

For example, face characteristic information is information which is generated by learning based on a large number of face image samples, and indicates image features such as shapes of face parts such as eyes and lips, and image features of the whole face such as disposition of face parts and color histogram of a face. Each of face parts includes face feature points such as corners of eyes and mouth.

Face position acquiring unit 130 sequentially acquires information of a position of the face and a position (position of face feature point) of the face part in the face on a screen included in the video, from the input video.

More specifically, face position acquiring unit 130 acquires face feature information required for detecting the face or face part from information storage unit 120. Face position acquiring unit 130 performs face detection with respect to the input video, and acquires position information of the face in an image frame. Next, face position acquiring unit 130 detects the position of the face part based on the obtained position information of the face and obtains the position information of the face part. A known technology for the face detection and face part detection can be adopted. Accordingly, face position acquiring unit 130 converts a position in the video of an extracted face into a position on a screen based on a predetermined positional relationship between video and the screen on which the video is displayed.

In addition, face position acquiring unit 130 tracks the position for each face in the video. For example, in a case where position differences in faces detected in each of a plurality of temporally consecutive image frames among a plurality of time series image frames constituting the video are within a predetermined range, face position acquiring unit 130 determines that the detected faces are the same face. Face position acquiring unit 130 tracks the position of the face by continuously performing such determination along a time axis of the video.

In addition, face position acquiring unit 130 acquires a relative position with respect to another face on the screen when a plurality of faces are included in each screen.

In addition, face position acquiring unit 130 outputs face position information indicating the position of the face and the position of the face part (hereinafter, appropriately referred to as "face position") on the acquired screen to makeup image superimposing unit 140.

Makeup image superimposing unit 140 superimposes the makeup image on the face part of the video output from imaging unit 110, based on the face position information output from face position acquiring unit 130. At this time, makeup image superimposing unit 140 acquires the makeup image from information storage unit 120. In addition, makeup image superimposing unit 140 changes the brightness or the like of the makeup image to be superimposed on a pixel basis and superimposes the makeup image of which brightness and the like changed on the face part of the video every time the brightness of the face in the video changes. The video (hereinafter, referred to as "virtual makeup video") to which the makeup image is appropriately superimposed is output to displayer 150.

For example, displayer 150 includes a liquid crystal display, and displays the virtual makeup video output from makeup image superimposing unit 140 on a screen of the liquid crystal display.

Image synthesis device 100 further includes the imaging button, and an information recording unit (not illustrated). The information recording unit cuts out the still image from the virtual makeup video and records the cut still image, and starts recording of the virtual makeup video at a timing where the imaging button is pressed.

<Configuration of Makeup Image Superimposing Unit>

Next, a configuration of the above-described makeup image superimposing unit 140 will be described.

Figure 3:
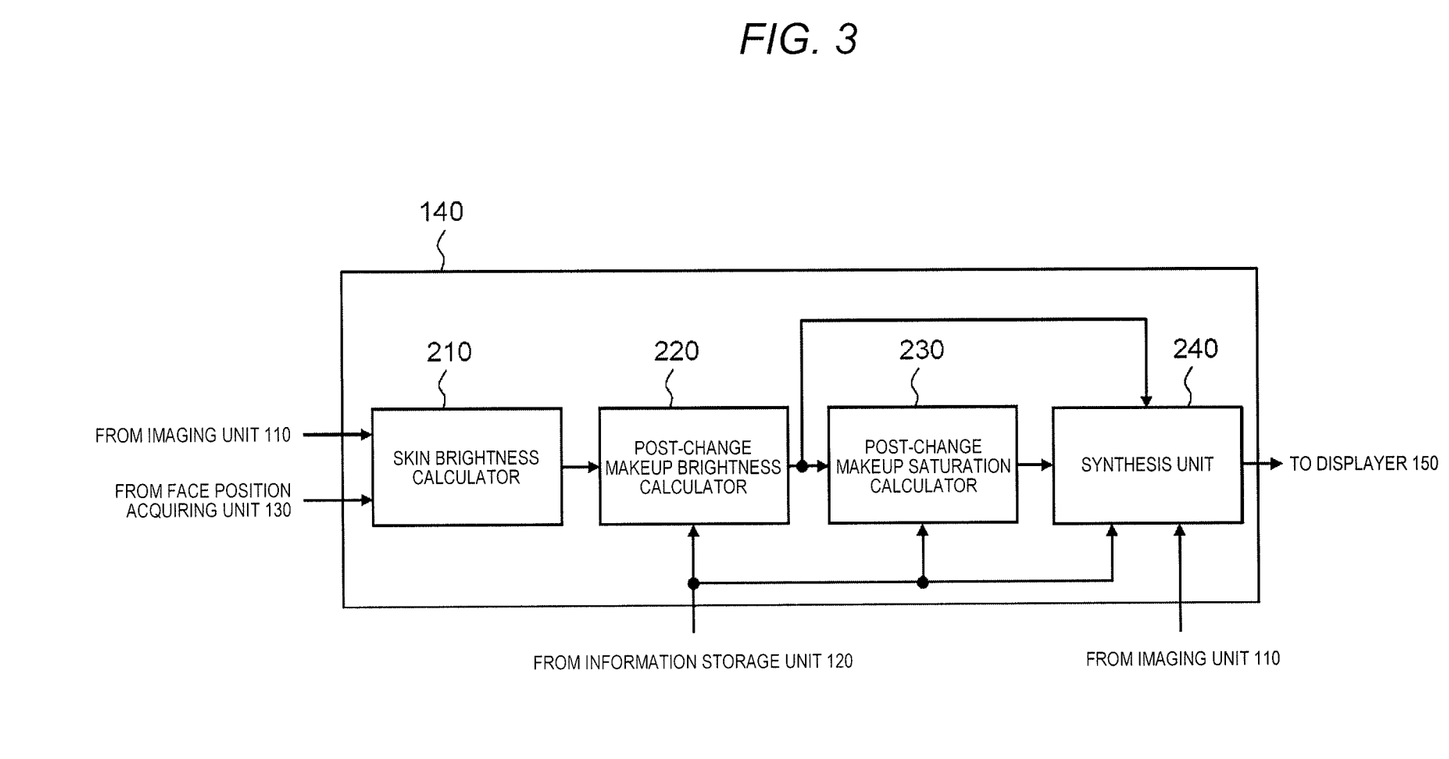
FIG. 3 is a block diagram illustrating an internal configuration of a makeup image superimposing unit illustrated in FIG. 2.

FIG. 3 is a block diagram illustrating an internal configuration of makeup image superimposing unit 140 illustrated in FIG. 2.

Figure 4:
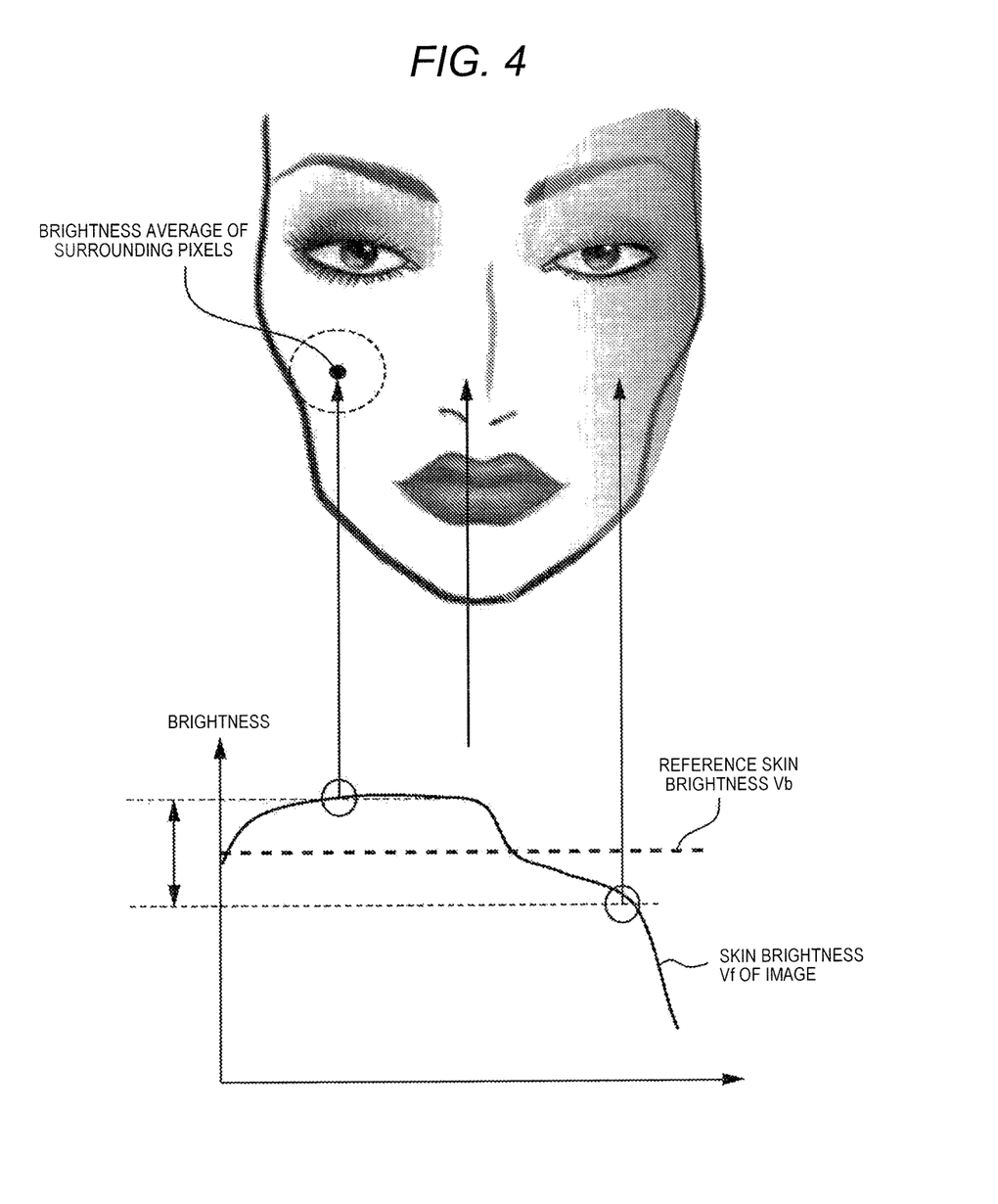
FIG. 4 is a diagram illustrating a change state in skin brightness when a target pixel is moved in the horizontal direction within a face region.

Skin brightness calculator 210 calculates skin brightness Vf of a target pixel in a face region by averaging brightness of surrounding pixels having hue close to the target pixel and outputs the calculated skin brightness Vf to post-change makeup brightness calculator 220, based on the video output from imaging unit 110 and the face position information output from face position acquiring unit 130. For reference, FIG. 4 illustrates how skin brightness Vf changes when the target pixel is moved in a horizontal direction within the face region.

Post-change makeup brightness calculator 220 receives designation of make-up colors (hue Hc, brightness Vc, and saturation Sc) with respect to reference skin brightness Vb from information storage unit 120. Post-change makeup brightness calculator 220 uses skin brightness Vf and brightness Vc of the makeup received the designation every time skin brightness Vf output from skin brightness calculator 210 changes, and calculates brightness Vc' of the makeup after the change according to a ratio of skin brightness Vf with respect to skin brightness Vb which will be a reference. The calculated brightness Vc' is output to post-change makeup saturation calculator 230 and synthesis unit 240.

Post-change makeup saturation calculator 230 receives the designation of colors (hue Hc, brightness Vc, and saturation Sc) of the makeup with respect to reference skin brightness Vb from information storage unit 120, and calculates saturation Sc' of the makeup after the change by using brightness Vc and saturation Sc of the makeup received the designation and post-change brightness Vc' output from post-change makeup brightness calculator 220. The calculated saturation Sc' is output to synthesis unit 240.

Synthesis unit 240 replaces brightness Vc' output from post-change makeup brightness calculator 220 with brightness Vc among the colors (hue Hc, brightness Vc, and saturation Sc) of makeup with respect to reference skin brightness Vb designated from information storage unit 120, and replaces saturation Sc' output from post-change makeup saturation calculator 230 with saturation Sc. Synthesis unit 240 synthesizes the video output from imaging unit 110 by using the colors (hue Hc, brightness Vc', and saturation Sc') of makeup after the change, and outputs a synthesis image to displayer 150.

<Processing Procedure of Makeup Image Superimposing Unit>

Next, a processing procedure of makeup image superimposing unit 140 will be described.

Figure 5:
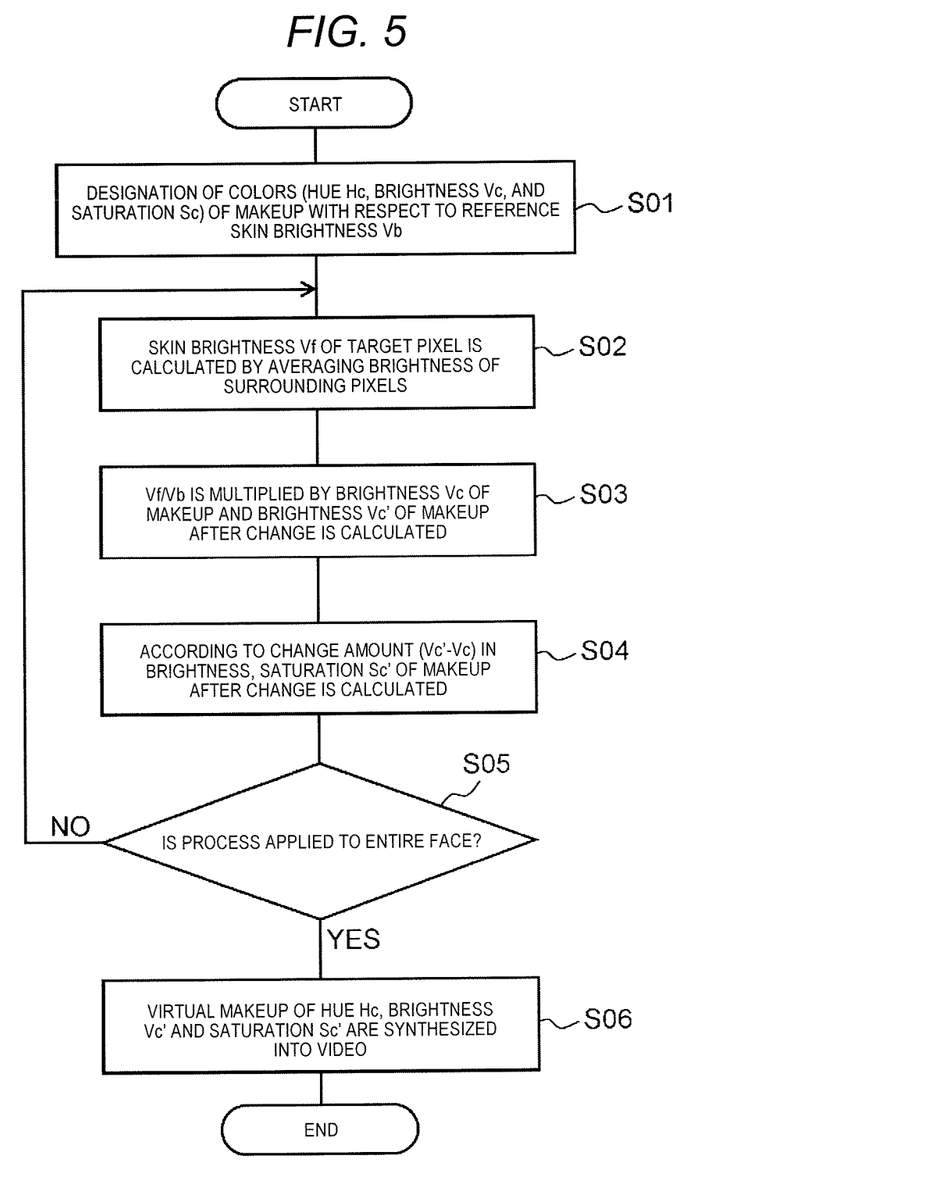
FIG. 5 is a flowchart illustrating a processing procedure of the makeup image superimposing unit illustrated in FIG. 3.

FIG. 5 is a flowchart illustrating a processing procedure of makeup image superimposing unit 140 illustrated in FIG. 3.

In step S01, makeup image superimposing unit 140 receives the designation of the colors (hue Hc, brightness Vc, and saturation Sc) of makeup with respect to reference skin brightness Vb from information storage unit 120.

In step S02, skin brightness calculator 210 calculates skin brightness Vf of the target pixel by averaging brightness of surrounding pixels based on the video output from imaging unit 110.

In step S03, post-change makeup brightness calculator 220 multiplies Vf/Vb by brightness Vc of the makeup and calculates brightness Vc' of the makeup after the change.

In step S04, post-change makeup saturation calculator 230 also changes saturation Sc of the makeup according to a change amount (Vc'-Vc) in brightness, and calculates saturation Sc' of the makeup after the change according to the following equation (1).

$$Sc'=(Vc'-Vc)/2+Sc \qquad (1)$$

Here, the saturation changes by half of a change rate of the brightness by equation (1). That is, the change rate in the brightness and the saturation becomes 2:1. This is because, in general, human eyes are more sensitive to differences in brightness than the saturation, in order to bring the change in makeup color close to the color difference captured by the human eyes.

In step S05, makeup image superimposing unit 140 determines whether or not processes of steps SO1 to S04 are applies to the entire face. In a case where the process is applied to the entire face, the process transitions to step S06, and in a case where the process is not applied to the entire face, the process returns to step S02.

In step S06, synthesis unit 240 synthesizes the virtual makeup having colors of hue Hc, brightness Vc' acquired in step S03, and saturation Sc' acquired in step S04 into the video of the face.

As described above, in image synthesis device 100 of embodiment 1, every time the skin brightness of the face of the video photographed by imaging unit 110 changes, the brightness and the saturation of the makeup image to be superimposed change on a pixel basis, and the makeup image in which the brightness and the saturation has changed are superimposed on the face part of the video. As a result, even if the brightness that illuminates the face changes, it is possible to synthesize the makeup image with an image familiar to the skin in real time.

(Embodiment 2)

In embodiment 1, the case where the brightness of makeup changes according to the brightness change of the skin is described. However, in embodiment 2, a case of considering a change in brightness based on peculiar reflection intensity in makeup will be described.

Figure 6:
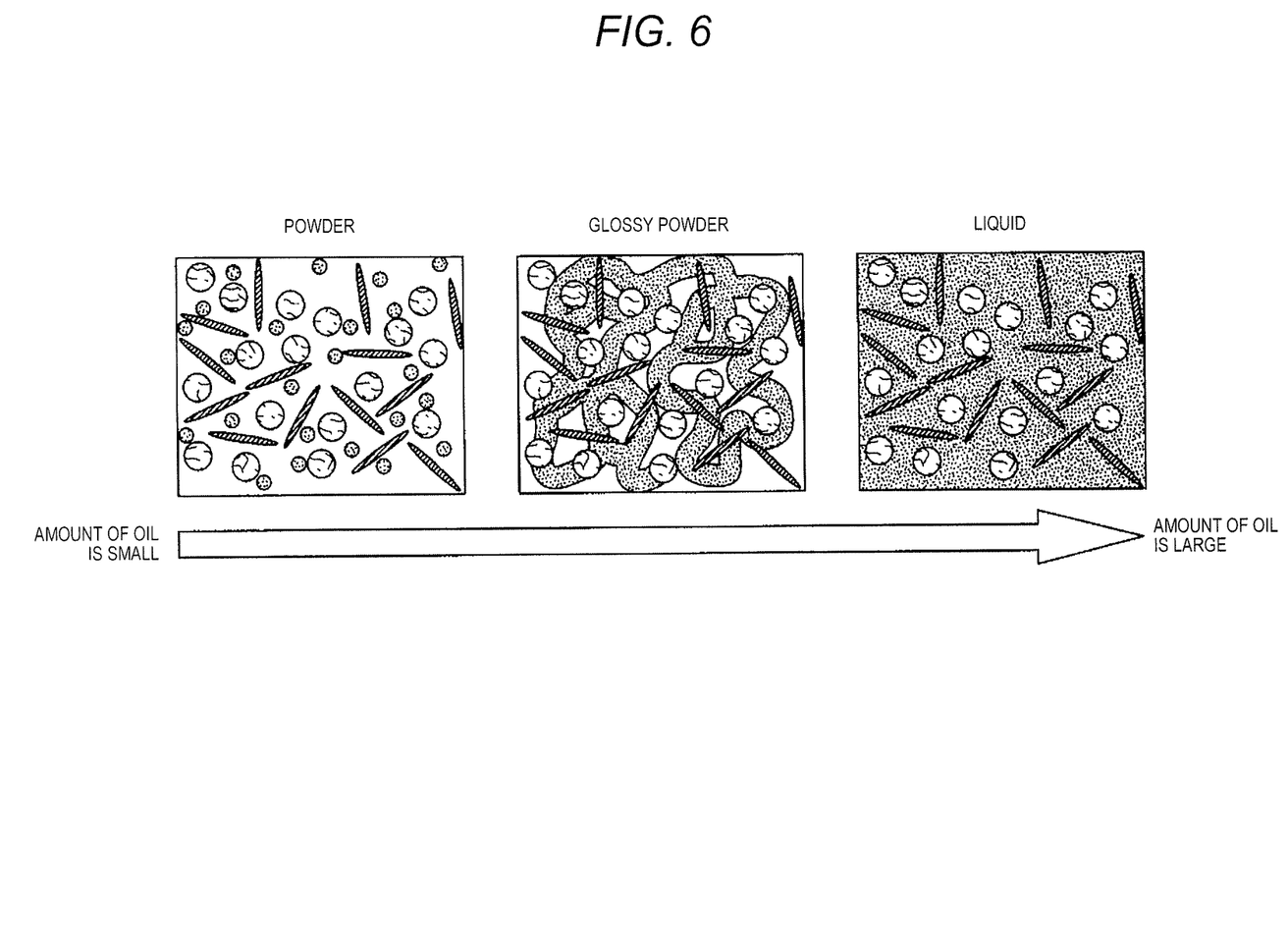
FIG. 6 is a diagram illustrating classification of makeup based on the amount of oil.

FIG. 6 illustrates classification of makeup (foundation) based on the amount of oil. As illustrated in FIG. 6, when the amount of oil is small, it is a powder foundation, when the amount of oil is medium, it is a glossy powder foundation, and when the amount of oil is large, it is a liquid foundation.

Figure 7:
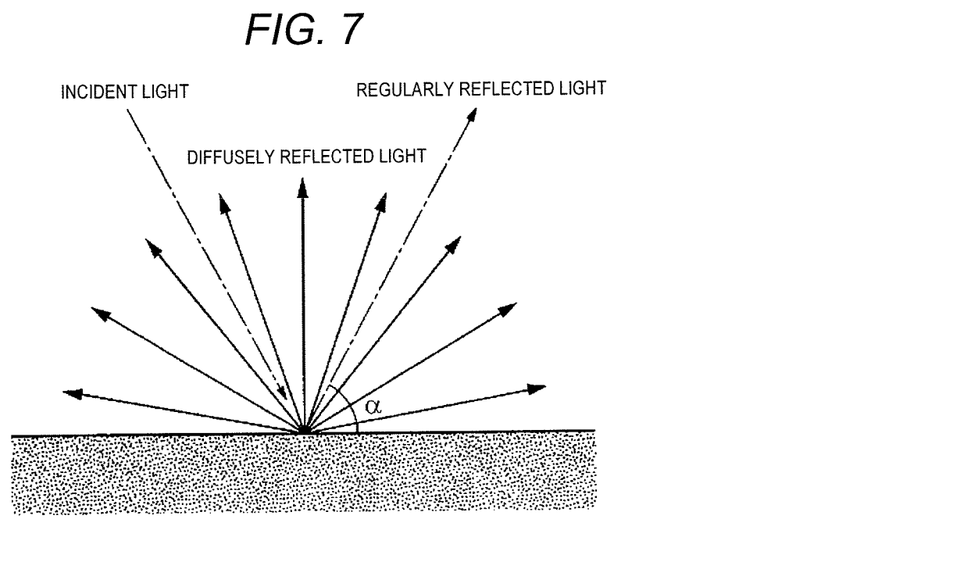
FIG. 7 is a diagram illustrating a reflection image of a glossy powder foundation.

FIG. 7 is a diagram illustrating a reflection image of the glossy powder foundation. As illustrated in FIG. 7, with respect to incident light, two kinds of reflected lights are generated, that is, regularly reflected light that shines most intensely and diffusely reflected light that shines weakly and brightly. An angle between the reflected light and the skin is set as a reflection angle α. In FIG. 7, an angle between the regularly reflected light and the skin is indicated as the reflection angle α.

Figure 8:
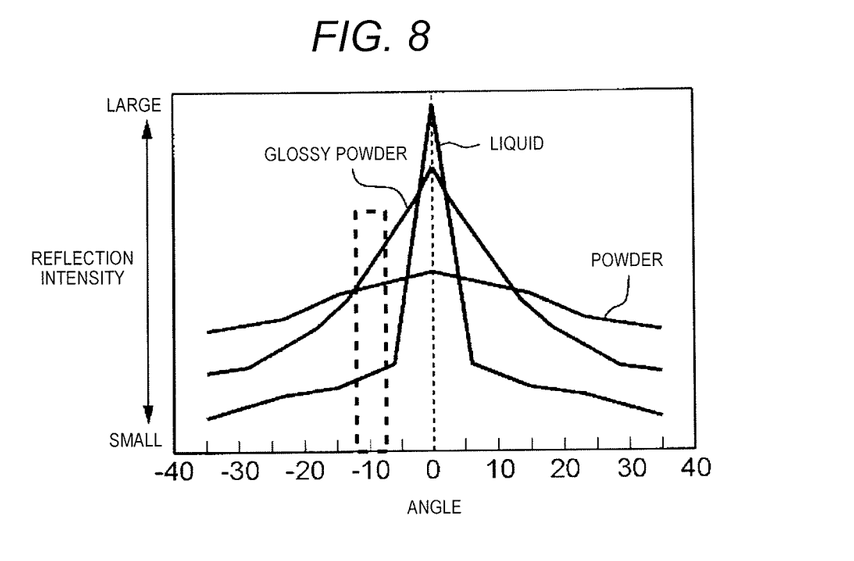
FIG. 8 is a diagram illustrating changes in reflection intensity due to angles.

FIG. 8 is a diagram illustrating changes in reflection intensity due to angles. In FIG. 8, the horizontal axis indicates the angle and the vertical axis indicates the reflection intensity. The angle indicates an angle formed by the regularly reflected light by setting the regularly reflected light as a reference (0°). In FIG. 8, reflection intensities of various foundations of powder, glossy powder, and liquid are illustrated. That is, the powder foundation is moderate without significantly changing the reflection intensity due to the angle. The liquid foundation forms a peak having large reflection intensity at an angle 0°, and the reflection intensity sharply decreases when deviating from the angle 0°. The reflection intensity at the angle 0° is taken as the vertex and the reflection intensity of the glossy powder foundation decreases as the angle spreads.

As illustrated by a portion surrounded by a dotted frame in the figure, the reflection intensities according to the property of the foundation vary even at the same angle (−10°). That is, it can be seen that the brightness changes the property of the foundation and the reflection angle to be used.

<Configuration of Makeup Image Superimposing Unit>

Next, a configuration of makeup image superimposing unit 140 according to embodiment 2 will be described.

Figure 9:
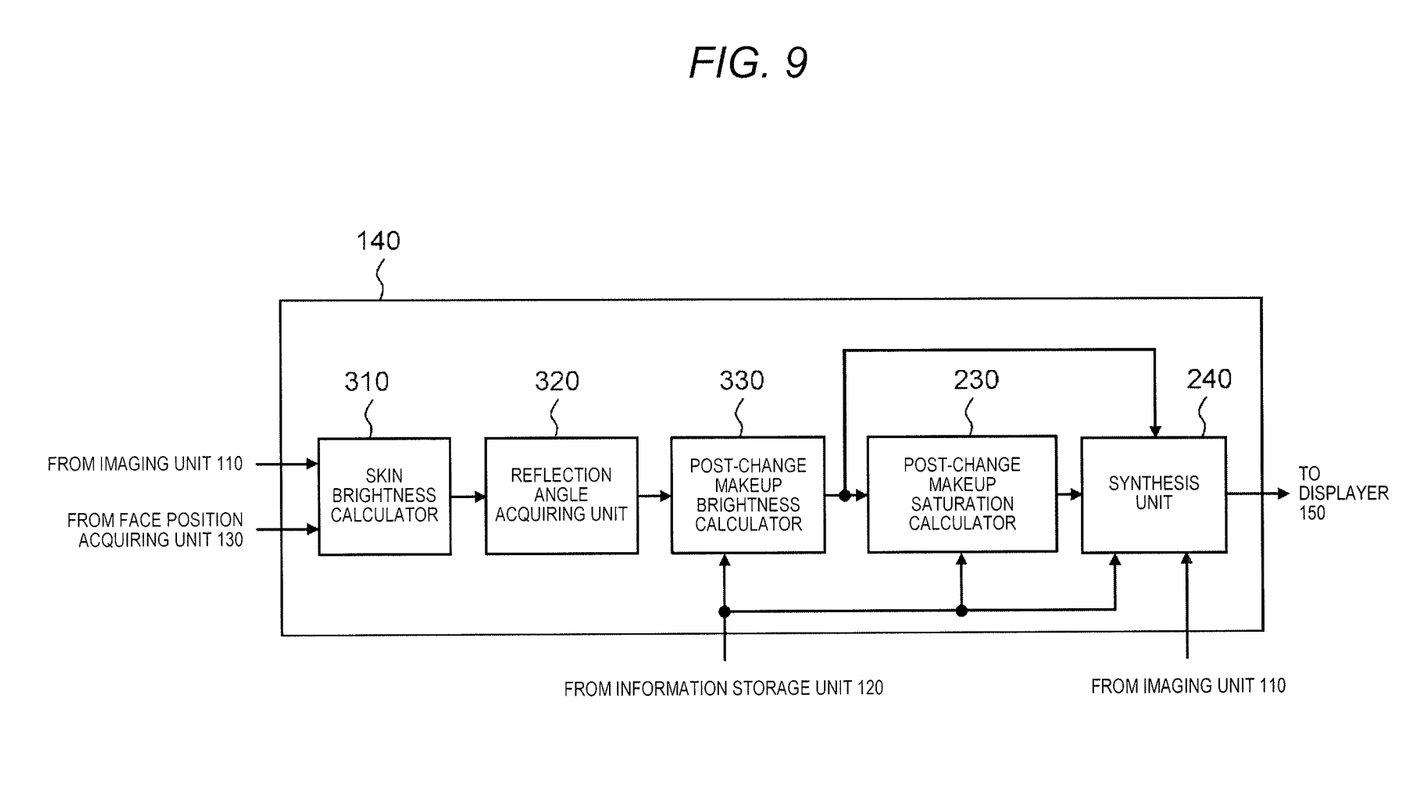
FIG. 9 is a block diagram illustrating an internal configuration of a makeup image superimposing unit according to embodiment 2.

FIG. 9 is a block diagram illustrating an internal configuration of makeup image superimposing unit 140 according to embodiment 2. FIG. 9 is different from FIG. 3 in that reflection angle acquiring unit 320 is added, skin brightness calculator 210 is changed to skin brightness calculator 310, and post-change makeup brightness calculator 220 is changed to post-change makeup brightness calculator 330.

Skin brightness calculator 310 calculates skin brightness Vf of the target pixel of the face region by averaging brightness of surrounding pixels having hue close to that of the target pixel, and outputs the calculated skin brightness Vf to reflection angle acquiring unit 320, based on the video output from imaging unit 110 and the face position information output from face position acquiring unit 130. In addition, skin brightness calculator 310 calculates skin brightness Vh of a regular reflection portion (portion having highest brightness in facial skin region), and outputs the calculated skin brightness Vh and skin brightness V1 of the darkest portion in the face region to reflection angle acquiring unit 320, based on the video output from imaging unit 110.

Figure 10:
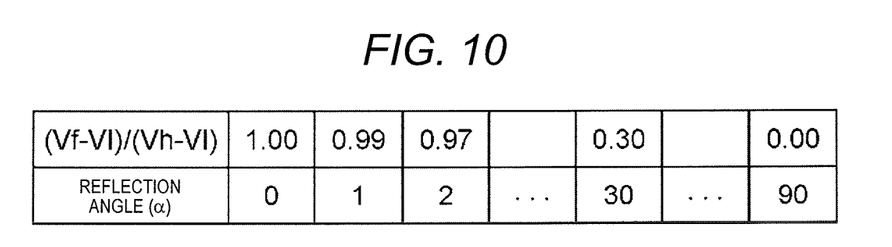
FIG. 10 is a diagram illustrating a reflection angle α calculation table.

As illustrated in FIG. 10, reflection angle acquiring unit 320 has a table of reflection angle α associated with (Vf−Vl)/(Vh−Vl). Reflection angle acquiring unit 320 acquires reflection angle α corresponding to (Vf−Vl)/(Vh−Vl) from the table by using skin brightnesses Vf, Vh, and Vl output from skin brightness calculator 310, every time skin brightness Vf output from skin brightness calculator 310 changes. The acquired reflection angle α is output to post-change makeup brightness calculator 330.

Figure 11:
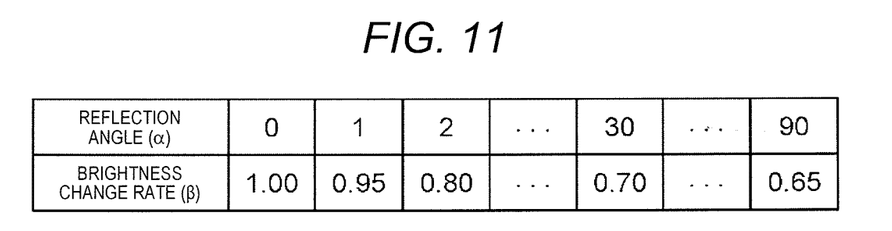
FIG. 11 is a diagram illustrating a brightness change rate β calculation table.

As illustrated in FIG. 11, post-change makeup brightness calculator 330 has information of a table of brightness change rate β associated with reflection angle α for each property of the makeup. Post-change makeup brightness calculator 330 acquires brightness change rate β corresponding to reflection angle α output from reflection angle acquiring unit 320 from the table. Post-change makeup brightness calculator 330 mutiplies the brightness of makeup Vc by the acquired brightness change rate β, calculates brightness Vc' after the change, and outputs the calculated brightness Vc' to post-change makeup saturation calculator 230.

<Processing Procedure of Makeup Image Superimposing Unit>

Next, a processing procedure of makeup image superimposing unit 140 will be described.

Figure 12:
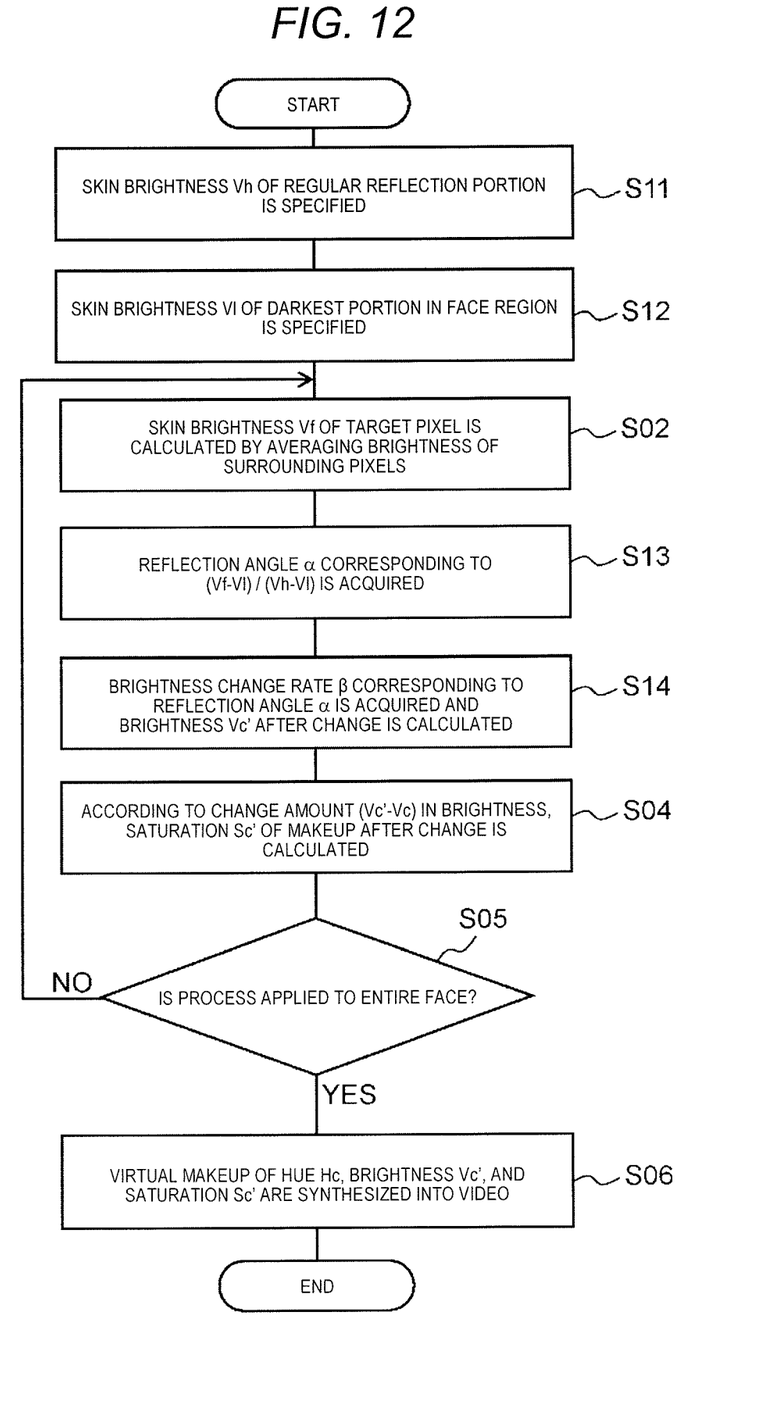
FIG. 12 is a flowchart illustrating a processing procedure of the makeup image superimposing unit illustrated in FIG. 9.

FIG. 12 is a flowchart illustrating a processing procedure of makeup image superimposing unit 140 illustrated in FIG. 9. In FIG. 12, the same reference numerals as those in FIG. 5 are assigned to common portions of FIG. 5, and redundant description is omitted.

In step S11, skin brightness calculator 310 calculates skin brightness Vh of the regular reflection portion, based on the video output from imaging unit 110.

In step S12, skin brightness calculator 310 specifies skin brightness Vl of the darkest portion, based on the video output from imaging unit 110.

In step S13, reflection angle acquiring unit 320 acquires reflection angle a corresponding to (Vf−Vl)/(Vh−Vl) from a table.

In step S14, post-change makeup brightness calculator 330 acquires brightness change rate β corresponding to reflection angle α acquired in step S13, multiplies the acquired brightness change rate β by brightness Vc of makeup, and calculates brightness Vc' after the change.

As described above, in image synthesis device 100 according to embodiment 2, every time the skin brightness of the face of the video photographed by imaging unit 110 changes, the change rate in brightness is calculated in consideration of the reflection intensity of light based on the property of makeup, the brightness and the saturation of the makeup image to be superimposed change on a pixel unit basis, and the makeup image of which the brightness and saturation are changed is superimposed on the face part of the video. As a result, even if the brightness that illuminates the face changes, it is possible to synthesize the makeup image with the image familiar to the skin in real time.

INDUSTRIAL APPLICABILITY

The image synthesis device and the image synthesis method according to the present disclosure are useful for synthesizing the makeup image with the image familiar to the skin in real time even if the brightness that illuminates the face changes.

REFERENCE MARKS IN THE DRAWINGS

100 image synthesis device
110 imaging unit
120 information storage unit
130 face position acquisition unit
140 makeup image superimposing unit
150 displayer
210, 310 skin brightness calculator
220, 330 post-change makeup brightness calculator
230 post-change makeup saturation calculator
240 synthesis unit
320 reflection angle acquiring unit

The invention claimed is:

1. An image synthesis device comprising:
a camera that photographs a video of a face;
a displayer that displays the photographed video; and
a calculator that
changes brightness of a makeup image to be superimposed with the face included in the video when a change of skin brightness of the face included in the video is calculated,
superimposes the makeup image of which the brightness is changed on the face included in the video,
calculates skin brightness of a target pixel in a region of the face included in the video by averaging brightness of surrounding pixels having hue close to the target pixel,
calculates brightness of the makeup image according to a ratio of the calculated skin brightness of the target pixel with respect to skin brightness to be a reference, in a case where the calculated skin brightness has changed from a previously calculated skin brightness,
calculates saturation of the makeup image according to a ratio of the calculated brightness of the makeup image with respect to the brightness of the makeup image to be a reference, and
calculates the saturation by half of a change rate in brightness.

2. The image synthesis device of claim 1,
wherein the calculator changes the change rate in brightness of the brightness of the makeup image in accordance with reflection intensity of the face caused by a property of makeup on the face.

3. An image synthesis method comprising:
photographing, via a camera, video of a face;
displaying, via a displayer, the photographed video;
changing, via a calculator, brightness of a makeup image to be superimposed with the face included in the video when a change of skin brightness of the face included in the video is calculated;
superimposing, via the calculator, the makeup image of which brightness is changed on the face included in the video;
calculating, via the calculator, skin brightness of a target pixel in a region of the face included in the video by averaging brightness of surrounding pixels having hue close to the target pixel;
calculating, via the calculator, brightness of the makeup image according to a ratio of the calculated skin brightness of the target pixel with respect to skin brightness to be a reference, in a case where the calculated skin brightness has changed from a previously calculated skin brightness;
calculating, via the calculator, saturation of the makeup image according to a ratio of the calculated brightness of the makeup image with respect to the brightness of the makeup image to be a reference; and calculating, via the calculator, the saturation by half of a change rate in brightness.

4. The image synthesis method of claim 3, further comprising, calculating, via the calculator, reflection intensity of the face in accordance with the skin brightness of the face included in the video, wherein the brightness of the makeup image superimposed on the face included in the video is changed in accordance with the calculated reflection intensity.

5. The image synthesis method of claim 3, further comprising, cutting out, via the calculator, a still image from the video on which the makeup image is superimposed at a timing where an imaging button on the camera is pressed.

6. The image synthesis method of claim 3, wherein the camera is disposed on a same side as the displayer displaying the video.

7. An image synthesis method comprising:

photographing, via a camera, video of a face;

displaying, via a displayer, the photographed video on which a makeup image is superimposed;

calculating, via a calculator, skin brightness of the face included in the video;

changing brightness and saturation of the makeup image in a case where the calculated skin brightness has changed from a previously calculated skin brightness; and superimposing the makeup image on the photographed video by using the changed brightness and saturation of the makeup image, wherein a change rate of saturation of the makeup image is smaller than a change rate of brightness of the makeup image.

8. The image synthesis method of claim 7, further comprising, calculating, via the calculator, reflection intensity of the face in accordance with the skin brightness of the face included in the video, wherein the brightness of the makeup image superimposed on the face included in the video is changed in accordance with the calculated reflection intensity.

9. The image synthesis method of claim 7, further comprising, cutting out, by the calculator, a still image from the video on which the makeup image is superimposed at a timing where an imaging button of the camera is pressed.

10. The image synthesis method of claim 7, wherein the camera is disposed on a same side as the displayer displaying the video.

* * * * *